2,721,204
DERIVATIVES OF 1,3,4-THIADIAZOLE-5-SULFONAMIDES

James Robert Vaughan, Jr., Darien, Conn., and Joyce Ann Eichler, New York, N. Y., assignors to American Cyanamid Company, New York, N. Y., a corporation of Maine No Drawing. Application May 7, 1954,
Serial No. 428,365

9 Claims. (Cl. 260—306.8)

This invention relates to a new class of organic compounds. More particularly, this invention relates to 2-sulfonamido-1,3,4-thiadiazole-5-sulfonamides having aryl, and 5-membered sulfur-containing heterocyclic substituents on the 2-sulfonamido group.

The compounds of the present invention may be represented by the following general formula:

wherein R is a member selected from the group consisting of aryl, and 5-membered sulfur-containing heterocyclic substituents. As specific examples of groups substitutable for R in the above general formula may be given the following: phenyl, p-acetylaminophenyl, p-bromophenyl, p - chlorophenyl, 3,4 - dichlorophenyl, p - aminophenyl, toluyl, and 2-acetylamino-1,3,4-thiadiazolyl.

Although a variety of methods may be used by those skilled in the art to prepare the compounds of this invention, a preferred method is to employ Schotten-Baumann reaction conditions—namely, acylation with sulfonyl chloride in an aqueous medium. In accordance with our process, the compound 2-amino-1,3,4-thiadiazole-5-sulfonamide is dissolved in a suitable alkali metal hydroxide such as potassium hydroxide or sodium hydroxide, a correspondingly substituted sulfonyl chloride and an equivalent of aqueous alkali are added simultaneously thereto with stirring. The sulfonyl chloride is preferably added directly, although if desired, the addition may be carried out in the presence of a suitable inert organic solvent such as benzene, dioxane, acetone, chloroform, ethyl acetate, toluene, or tetrahydrofuran.

The reaction proceeds smoothly at temperatures varying from −10° C. to 50° C. We prefer to use a range of 0° C. to 5° C. Since the reaction is exothermic, better yields are obtained under lower temperature conditions. If desired however, the mixture may be allowed to stand and cool at room temperature. The reaction reaches completion in a comparatively short time, usually about 30 minutes.

A suitable organic solvent such as ether or ethyl acetate is now added to the reaction mixture to remove undesirable by-products and unreacted starting materials. The aqueous phase is separated and acidified with an organic or mineral acid such as for example hydrochloric, sulfuric, or acetic. The product precipitates out readily and is purified by recrystallization from water.

The 2-substituted-1,3,4-thiadiazole-5-sulfonamides of the present invention are inhibitors of the enzyme "carbonic anhydrase." Because of this unique pharmacological property, they find useful application in the field of medicine in the treatment of conditions associated with fluid retention in body tissues. For example, they are of value as diuretic agents in the treatment of congestive heart failure, and are especially advantageous in this respect in that they are non-toxic, non-mercurial, orally administrable compounds. Other diseases which respond to treatment with the compounds of this invention are epilepsy, glaucoma and nephritis.

This invention will be further described in greater detail by the following specific examples. It should be understood, however, that although these examples may set forth in particular detail some of the more specific features of the invention, they are given primarily for purposes of illustration and the invention in its broader aspects is not to be construed as limited thereto. All parts are by weight unless otherwise indicated.

Example I

To a solution of 3.60 grams (0.02 M) of 2-amino-1,3,4-thiadiazole-5-sulfonamide in 8 cc. of 2.5N sodium hydroxide (0.02 M) were added simultaneously and with stirring at room temperature, 4 cc. of 5N sodium hydroxide (0.02 M) and 3.50 grams (0.02 M) of benzenesulfonyl chloride. The reaction mixture, which became quite warm due to exothermic heat of reaction, was recooled to room temperature and stirred for an additional 30 minutes. The solution was then extracted with 25 cc. of ether and the aqueous phase separated, treated with activated charcoal (Darco), filtered and acidified with concentrated hydrochloric acid to congo red. On cooling and stirring, the product separated slowly from this solution as a finely divided white solid, M. P. 198–202° C. dec. Recrystallization of this material from 70 cc. of hot water gave 2-benzenesulfonamido-1,3,4-thiadiazole-5-sulfonamide, which melted at 238–241° C. dec.

Example II

The product was prepared by the method of Example I from 3.60 grams (0.02 M) of 2-amino-1,3,4-thiadiazole-5-sulfonamide and 4.67 grams (0.02 M) of p-acetylaminobenzenesulfonyl chloride. The material had a M. P. of 258–265° C. dec. Recrystallization from two 500 cc. portions of hot water gave 2-(p-acetylaminobenzenesulfonamido)-1,3,4-thiadiazole-5-sulfonamide, which melted at 285–290° C. dec.

Example III

The product was prepared by the method of Example I from 3.60 grams (0.02 M) of 2-amino-1,3,4-thiadiazole-5-sulfonamide and 5.11 grams (0.02 M) of p-bromobenzenesulfonyl chloride, yielding a compound having a M. P. of 240–260° C. dec. Two recrystallizations of the crude material from hot water gave 2-(p-bromobenzenesulfonamido) - 1,3,4 - thiadiazole - 5 - sulfonamide, which melted at 271–272° C. dec.

Example IV

The product was prepared by the method of Example I from 2.70 grams (0.015 M) of 2-amino-1,3,4-thiadiazole-5-sulfonamide and 3.18 grams (0.015 M) of p-chlorobenzenesulfonyl chloride yielding a product having a M. P. of 255–260° C. dec. Two recrystallizations of the crude material from hot water gave 2-(p-chlorobenzenesulfonamido) - 1,3,4 - thiadiazole - 5 - sulfonamide which melted at 270–271° C. dec.

Example V

The compound was prepared by the method of Example I except that a reaction temperature of 5° C. was used and the p-toluene-sulfonyl chloride (3.80 grams, 0.02 M) was added as a solution in acetone. The product had a M. P. of 245–247° C. dec. Two recrystallizations of this material from 300 cc. portions of hot water gave 2-(p-toluenesulfonamido)-1,3,4-thiadiazole-5-sulfonamide which melted at 267–268° C. dec.

Example VI

The product was prepared by the method of Example I using a reaction temperature of 5° C. The 3,4-dichlorobenzenesulfonyl chloride (4.90 grams) was added directly. The crude product had a M. P. of 214–260° C. Two recrystallizations of the crude material from 800 cc. portions of hot water gave 2-(3,4-dichlorobenzenesulfonamido)-1,3,4-thiadiazole-5-sulfonamide, which melted at 274–276° C. dec.

Example VII

The compound was prepared by the method of Example I using a reaction temperature of 0° C., and 2-acetylamino-1,3,4-thiadiazole-5-sulfonyl chloride (4.83 grams) was added as a solution in 15 cc. of tetrahydrofuran. The crude product had a M. P. of 251–255° C. dec. Several recrystallizations from hot water gave 2-(2-acetylamino-1,3,4 - thiadiazole - 5 - sulfonamido)-1,3,4-thiadiazole-5-sulfonamide, which melted at 247–250° C. dec.

Example VIII

A 1.70 gram (0.0045 M) sample of 2-(p-acetylaminobenzenesulfonamido)-1,3,4-thiadiazole-5-sulfonamide was suspended in 20 cc. of 6N hydrochloric acid and the mixture heated at reflux for 15 minutes to give a clear solution. On cooling, the product crystallized from the acid reaction mixture (M. P. ca. 195–200° C.). On recrystallizing this from 200 cc. of hot water the product separated as the free base, 2-sulfanilamido-1,3,4-thiadiazole-5-sulfonamide, instead of as the expected hydrochloride; M. P. 259–261° C. dec. The product gives a negative halogen test, is soluble in concentrated hydrochloric acid but insoluble in dilute hydrochloric acid.

We claim:

1. The compound 2-benzenesulfonamido-1,3,4-thiadiazole-5-sulfonamide.
2. The compound 2-(p-bromobenzenesulfonamido)-1,3,4-thiadiazole-5-sulfonamide.
3. The compound 2-(p-chlorobenzenesulfonamido)-1,3,4-thiadiazole-5-sulfonamide.
4. The compound 2 - (3,4 - dichlorobenzenesulfonamido)-1,3,4-thiadiazole-5-sulfonamide.
5. The compound 2 - (p - toluenesulfonamido) - 1,3,4-thiadiazole-5-sulfonamide.
6. Compounds having the general formula:

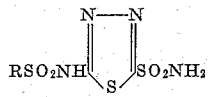

wherein R is a member selected from the group consisting of phenyl, p-acetylaminophenyl, p-bromophenyl, p-chlorophenyl, toluyl, 3,4-dichlorophenyl, p-aminophenyl and 2-acetylamino-1,3,4-thiadiazolyl substituents.

7. A method for preparing compounds having the general formula:

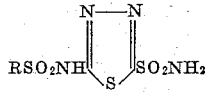

wherein R is a member selected from the group consisting of phenyl, p-acetylaminophenyl, p-bromophenyl, toluyl, 3,4-dichlorophenyl, p-aminophenyl and 2-acetylamino-1,3,4-thiadiazolyl substituents, which comprises reacting a 2-amino-1,3,4-thiadiazole-5-sulfonamide dissolved in an alkali metal hydroxide with a corresponding sulfonyl derivative under basic conditions at a temperature from about −10° C. to about 50° C.

8. A method as set forth in claim 7, wherein the reaction takes place in the presence of an inert organic solvent.

9. A method as set forth in claim 7, wherein the reaction takes place in the presence of acetone.

References Cited in the file of this patent

UNITED STATES PATENTS 2,554,816    Clapp et al. _____ May 29, 1951